United States Patent [19]

Jacquemet et al.

[11] Patent Number: 4,546,223
[45] Date of Patent: Oct. 8, 1985

[54] HIGH VOLTAGE METAL-CLAD CIRCUIT BREAKER

[75] Inventors: Bernard Jacquemet, St. Simeon de Bressieux; Jean-Paul Ravet, Grenoble, both of France

[73] Assignee: Merlin Gerin, Grenoble, France

[21] Appl. No.: 480,016

[22] Filed: Mar. 29, 1983

[30] Foreign Application Priority Data

Apr. 5, 1982 [FR] France ................................ 82 06017

[51] Int. Cl.⁴ ............................................ H01H 33/54
[52] U.S. Cl. .............................. 200/148 R; 200/150 J; 361/376
[58] Field of Search ...................... 200/150 J, 148 R; 361/376

[56] References Cited

U.S. PATENT DOCUMENTS 2,412,259 12/1946 Graves, Jr. ........................... 361/376
2,615,707 10/1952 Rowe et al. .............................. 267/1
3,233,069 1/1966 Date .............................. 200/150 JA

FOREIGN PATENT DOCUMENTS 391829 of 1933 United Kingdom ............ 200/150 J

OTHER PUBLICATIONS

Patent Abstracts of Japan, vol. 3, No. 10, Jan. 29, 1979, p. 129E87, JP-53-139148.
Patent Abstracts of Japan, vol. 1, No. 21, Mar. 25, 1977, p. 1007e77, JP-53-15540.
Patent Abstracts of Japan, vol. 4, No. 170, Nov. 22, 1980, p. 652E35, JP-55-118610.

*Primary Examiner*—Robert S. Macon
*Attorney, Agent, or Firm*—Parkhurst & Oliff

[57] ABSTRACT

The column-shaped active part of a metal-clad circuit breaker is fastened at its upper part by stays to the metal tank. The stays show some elasticity, so as to exert a centering force on the column and oppose any excessive displacement when a shock or an earthquake occurs.

8 Claims, 4 Drawing Figures

HIGH VOLTAGE METAL-CLAD CIRCUIT BREAKER

BACKGROUND AND SUMMARY OF THE INVENTION

The invention relates to a high voltage metal-clad circuit breaker having an elongated vertical metal tank, obturated by a top cover and filled with a high dielectric strength gas, the active part of the circuit breaker having a column-shape which is placed in the tank and lies on the lower bottom of the tank by insulating feet.

A metal-clad circuit breaker of the type mentioned, for example described in U.S. Pat. No. 3,895,202, can reach a height of severals meters, and the oscillations resulting from a shock during shipment or when an earthquake occurs, can generate excessive stresses and damage of the active part located in the tank. The conventional solutions of clamping the active part during shipment cannot be applied when the tanks are sealed and filled with gas at the factory, and they do not solve the problems about earthquakes.

An object of the present invention is to remedy these disadvantages and to permit the realization of a strong fixing device allowing for differential thermal expansion of the constituent parts of the circuit breaker.

In accordance with the invention, the circuit breaker is characterized by the fact that the upper part of the column is secured to the tank by at least two elastic stays capable of exerting a radial component to maintain the column in position.

The stays radially extend between the upper part of the column and the cover, the stays being regularly distributed on the column circumference. The elasticity of the stays permits a compensation of thermal expansions enough to limit the stresses exerted on the active part of the circuit breaker. The number of stays can be increased depending of the intensities of forecast earthquakes, the minimal number being two. The stays are constituted by an insulating rod ensuring the insulation between the active part of the circuit breaker and the generally grounded metal tank, the insulating rod carrying at its ends anchor parts, one of which presents a set screw. The stay shows an elasticity compression and traction from a rest equilibrium position, and the adjusting device does not exert a force on the active part of the circuit breaker. The mounting of the action part of the circuit breaker is carried out at a temperature of 15° to 20° C. When the temperature increases or decreases, the stays will be compressed or stretched but will always ensure a force to center the column. It is advantageous to hinge the stays on the upper part of the column for preventing any sticking of the column.

BRIEF DESCRIPTION OF THE DRAWINGS

Other advantages and objectives will more clearly appear from the following description, wherein reference is made to the accompanying drawing, in which.

DETAILED DESCRIPTION OF THE PREFERRED EMBODIMENTS

Figure 1:
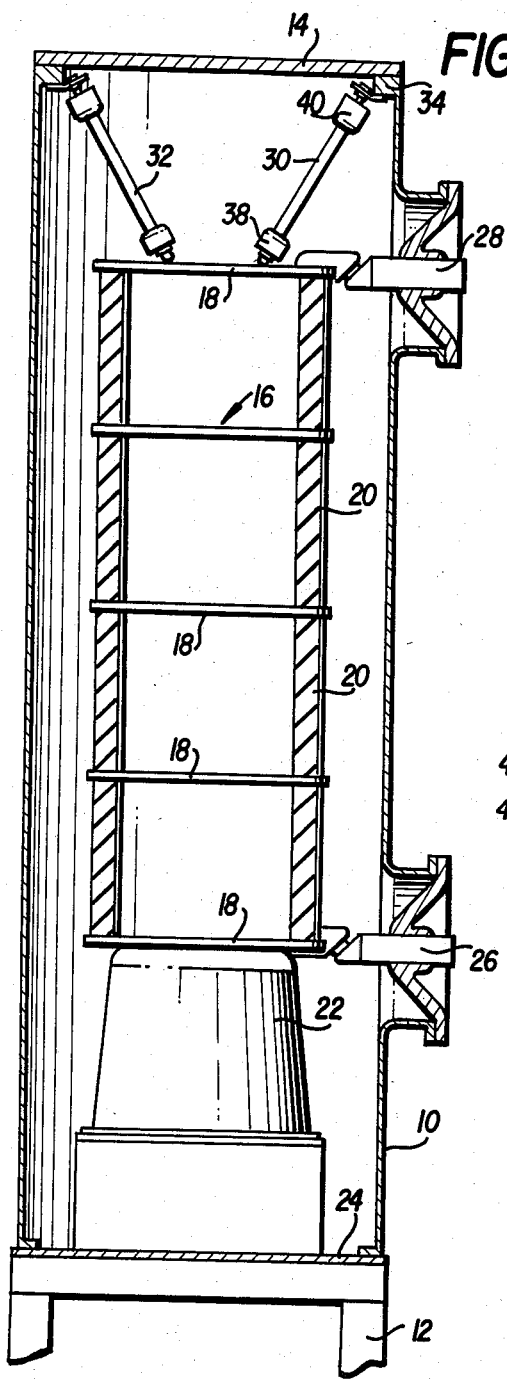
FIG. 1 is an axial sectional schematic view of a circuit breaker according to the invention.

On the Figures a cylindrical metal tank 10 is vertically disposed on a supporting frame 12. The tank 10 is tightly obturated by a top cover 14 and is filled with a high dielectric strength gas, such as the sulfur hexafluoride under pressure.

Inside the tank 10 is coaxially disposed a column 16 forming the active part of the circuit breaker. The active part 16 comprises four break gaps connected in series and each disposed between two successive plateaus 18 connected by insulating spacers 20. The column 16 lays on the bottom 24 of the tank 10 by means of an insulating base 22. Tight bushings 26, 28, connected to the lower and upper plateaus 18 respectively, constitute the entrances and outlets of the circuit breaker. Such a circuit breaker is known and forms the subject of the previously cited U.S. Pat. No. 3,895,202, the disclosure of which is herein incorporated by reference for other non-essential details. It is clear that the number of break gaps can be different.

Figure 2:
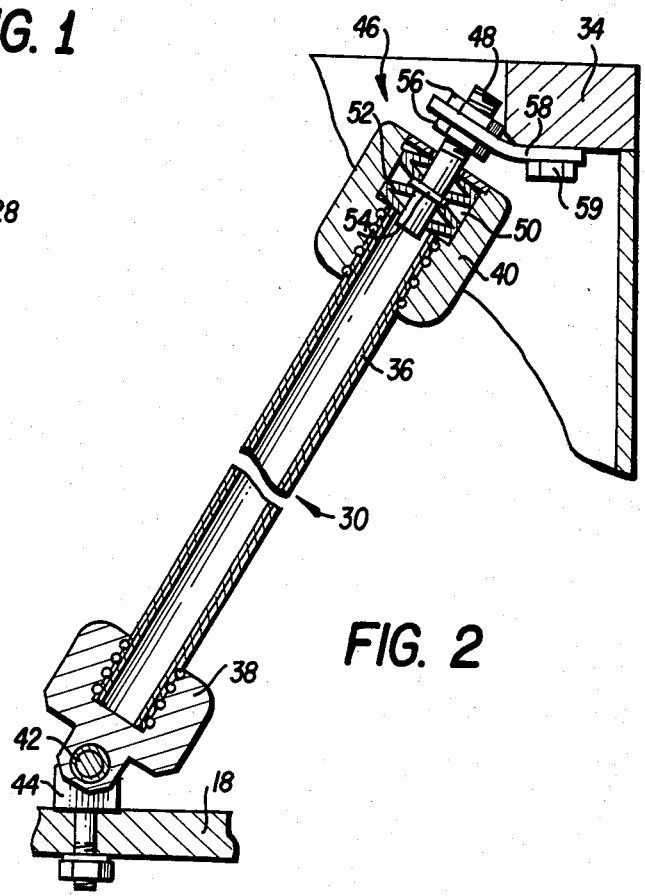
FIG. 2 is a view on an enlarged scale of a stay according to FIG. 1.
Figure 3:
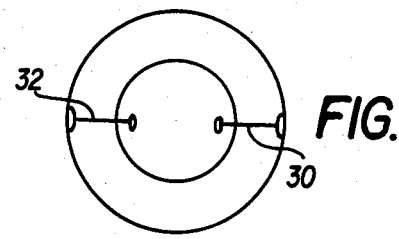
FIG. 3 is a top view, showing the two fixing stays according to FIG. 1.

According to the present invention, two stays 30, 32 are anchored on the one hand to the upper plateau 18 of the column 16, and on the other hand to the cover 14 or more exactly to a flange 34 to fasten the cover 14, the flange 34 obliquely extending in a diametral plane of the tank 10. The stays 30, 32 are identical and only one 30 of them will be described in detail referring to FIG. 2. The stay 30 comprises an insulating rod or connecting rod 36 rigidly secured at its ends to anchor parts 38, 40. The part 38 is hinged by a ball 42 on a fork-joint 44 bolted on the upper plateau 18. The opposite anchor part 40 presents a telescopic connection 46 constituted by a sliding fastening rod 48 coaxial by extending in a housing 50 of elastic washers 52. The fastening rod 48 carries a flange 54 interposed between the elastic washers 52, which attract the rod 48 in an equilibrium intermediate position. The elastic connection 46 permits a shortening and an elongation of the stay 30 against the elastic force of springs or washers 52. The fastening rod 48 threaded at its ends is secured to a support 58 by two set nuts 56, itself secured to the flange 34. The support 58 can be fastened to the flange 34 by screws 59, which advantageously are the screws or bolts to fasten the cover 14. Thus is avoided any puncture of the tank 10 or cover 14 or any additional fastening part. The telescopic connection 46 is accommodated to permit a slight rotation of the stays, and it is useless to provide for on the side of the anchor part 40 a fastening ball similar to the ball 42 of the part 38. The stay 30 obliquely extends and it is easy to see that it is capable of exerting a radial component on the plateau 18 of the column 16 upper part. The inclination angle of the stay 30 is of course function of the fastening point 44 on the upper plateau 18 and of the gap between this plateau 18 and the cover 14.

According to the invention the device is brought into play according to the following manner:

The stays 30, 32 are set before the placing of the cover 14 and the set nuts 56 are clamped so that at a room temperature of nearly 15° to 20° C. the telescopic connection 46 is in the equilibrium position. In this position the stays 30, 32 do not exert any force on the upper plateau 18 and are inactive. The insulation rod 36 of the stays 30, 32 ensures the insulation between the active part 16 and the metal tank 10, and the tank can be filled with sulfur hexafluoride under pressure in the factory, of course after closing the cover 14. It is understood that, when a shock or an earthquake occurs leading for example to shift the upper part of the column 16 towards the right on FIG. 1, the stay 30 is compressed, whereas the stay 32 is elongated. The elastic telescopic connection 46 of the stays 30, 32 works against this shortening and this elongation and exerts on the plateau 18 a reaction leading to maintain the column 16 in its middle position. The reaction depends of the characteristics of the elastic washers 52, which will be chosen in consequence. Any excessive displacement capable of damaging the column 16 is thus avoided. It is convenient to note that a displacement of the upper plateau 18 in a plane perpendicular to the one of FIG. 1, induces an elongation of the stays 30, 32 and a centering reaction as it is described above. It is clear that the stays 30, 32 exert this centering force whatever the displacement direction of the upper plateau 18. When there is a temperature variation the spacing between the upper plateau 18 and the cover 14 varies because of the different thermal expansions of the tank 10 and the column 16. When the upper plateau 18 moves apart from the cover 14, the stays 30, 32 are elongated by putting the elastic connection 46 under tension. This presentation does not modify the centering force exerted by the stays 30, 32 when the column 16 oscillates. The elongation of the stays 30, 32 involves a relative rotation permitted by the balls 42 and the elastic connection 46.

Figure 4:
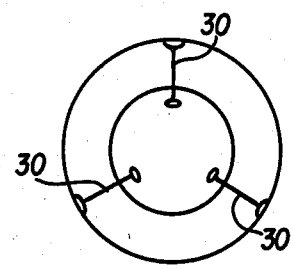
FIG. 4 is a view similar to FIG. 3, showing a fastening with three stays.

The centering force obtained by two stays 30, 32 is different according as the displacement occurs in the stays plane of the stays or in a perpendicular plane, and it is advantageous to use a superior number of stays, for example three or four, the regular distribution being of course respected. FIG. 4 illustrates as an example a fixing with three stays disposed at an angle of 120°. The numbers of stays will be chosen depending of the intensities of predicted shocks or earthquakes.

The invention is not at all limited to the embodiments described herein, but on the contrary it extends to any variant, in particular to the one in which the stays 30, 32 would be constituted in an elastic cast solid part, or to the one in which the stays 30, 32 would extend in a radial direction.

We claim:

1. A high voltage, metal-clad circuit breaker, comprising: an elongated gas tight metal tank having a top cover and a lower bottom and filled with a high dielectric strength gas, an active part having a column-like shape and placed in said tank of the circuit breaker, the active part having an upper part and a lower part, insulating feet lying on the lower bottom of the tank and supporting the lower part of said active part, and at least two elastic stays secured to the upper part of said active part and to said tank for exerting a radial component to maintain the active part in position.

2. The circuit breaker according to claim 1, wherein said stays are anchored on the one hand to the upper part of the active part and on the other hand to the inner side of the cover of the tank.

3. The circuit breaker according to claim 2, having bolts to fasten said cover to said tank, said stays being anchored to said bolts.

4. The circuit breaker according to claim 1, wherein at least three stays are symmetrically distributed on the upper part of the active part.

5. The circuit breaker according to claim 1, wherein each of said stays comprises an insulating connecting rod and two anchor terminal parts, said stay showing an elasticity under compression and traction.

6. The circuit breaker according to claim 5, wherein one of said terminal parts forms a telescopic connection biased to an inactive intermediate position.

7. The circuit breaker according to claim 6, wherein the telescopic connection comprises a rod with a stop and two springs mounted in opposition and on both sides of said stop.

8. The circuit breaker according to claim 1, wherein each stay is pivotally mounted on the upper part of said active part.

* * * * *